United States Patent
Camps Raga

(10) Patent No.: US 11,381,330 B2
(45) Date of Patent: Jul. 5, 2022

(54) POINT-SOURCE MODEL FOR SIMULATING NEAR-FIELD EFFECTS FROM STRUCTURES OF AN ANTENNA

(71) Applicant: Aptiv Technologies Limited, St. Michael (BB)

(72) Inventor: Bruno F. Camps Raga, Westfield, IN (US)

(73) Assignee: Aptiv Technologies Limited, St. Michael (BB)

( * ) Notice: Subject to any disclaimer, the term of this patent is extended or adjusted under 35 U.S.C. 154(b) by 204 days.

(21) Appl. No.: 16/922,740

(22) Filed: Jul. 7, 2020

(65) Prior Publication Data

US 2022/0014289 A1    Jan. 13, 2022

(51) Int. Cl.
*H04B 17/391* (2015.01)
*H04B 17/345* (2015.01)
*H04B 17/373* (2015.01)

(52) U.S. Cl.
CPC ....... *H04B 17/3912* (2015.01); *H04B 17/345* (2015.01); *H04B 17/373* (2015.01); *H04B 17/3913* (2015.01)

(58) Field of Classification Search
CPC .............. H04B 17/3912; H04B 17/345; H04B 17/373; H04B 17/3913
See application file for complete search history.

(56) References Cited

U.S. PATENT DOCUMENTS

| | | | |
|---|---|---|---|
| 6,064,334 A | 5/2000 | Ikizyan et al. | |
| 6,753,780 B2 | 6/2004 | Li | |
| 6,762,712 B2 | 7/2004 | Kim | |
| 7,348,880 B2 | 4/2008 | Hules et al. | |

(Continued)

FOREIGN PATENT DOCUMENTS

| | | |
|---|---|---|
| DE | 102014212390 | 12/2015 |
| EP | 3546979 | 10/2019 |
| WO | 2015184406 | 12/2015 |

OTHER PUBLICATIONS

"Extended European Search Report", EP Application No. 19183296.3, dated Jan. 3, 2020, 7 pages.

(Continued)

*Primary Examiner* — Natasha W Cosme
(74) *Attorney, Agent, or Firm* — Sawtooth Patent Group PLLC

(57) ABSTRACT

This document describes techniques and systems to generate a point-source model for simulating near-field effects from structures of an antenna. The techniques and systems generate, based on near-field values extracted from electromagnetic simulations, respective far-field radiation patterns for active elements and, in some cases, passive elements of the antenna array. The far-field radiation patterns account for electromagnetic interactions between the active elements and an antenna structure, which can include passive elements of the antenna array. The techniques and systems output the far-field radiation patterns, which are effective to simulate, using an asymptotic numerical method, electromagnetic interactions between the antenna array and at least one interaction structure. Using the described point-source model, engineers can quickly and accurately simulate electromagnetic interactions between the antenna array and the interaction structure for various configurations and applications of the antenna array.

20 Claims, 4 Drawing Sheets

(56) References Cited

U.S. PATENT DOCUMENTS

| | | |
|---|---|---|
| 9,157,992 B2 | 10/2015 | Wang et al. |
| 9,671,492 B2 | 6/2017 | Diewald |
| 10,401,479 B2 | 9/2019 | Mabrouk et al. |
| 10,436,888 B2 | 10/2019 | Li et al. |
| 10,457,161 B2 | 10/2019 | Lu-Dac et al. |
| 10,627,480 B2 | 4/2020 | Nayyar et al. |
| 10,634,777 B2 | 4/2020 | Oh et al. |
| 10,705,198 B2 | 7/2020 | Santra et al. |
| 10,775,493 B2 | 9/2020 | Santra et al. |
| 11,047,950 B2 | 6/2021 | Nayyar et al. |
| 11,177,854 B2 | 11/2021 | Ioffe et al. |
| 2003/0025631 A1 | 2/2003 | Kim |
| 2003/0201894 A1 | 10/2003 | Li |
| 2010/0066595 A1 | 3/2010 | Lee et al. |
| 2013/0201054 A1 | 8/2013 | Wang et al. |
| 2015/0369911 A1 | 12/2015 | Mabrouk et al. |
| 2016/0018511 A1 | 1/2016 | Nayyar |
| 2017/0102457 A1 | 4/2017 | Li et al. |
| 2018/0170213 A1 | 6/2018 | Lu-Dac et al. |
| 2019/0302252 A1 | 10/2019 | Santtra et al. |
| 2019/0302253 A1 | 10/2019 | Santra et al. |
| 2019/0310360 A1 | 10/2019 | Hershkowitz |
| 2020/0111382 A1 | 4/2020 | Sarabandi et al. |
| 2020/0180472 A1 | 6/2020 | Lu-Dac et al. |
| 2020/0225315 A1 | 7/2020 | Nayyar et al. |
| 2020/0412407 A1 | 12/2020 | Ioffe et al. |
| 2021/0278498 A1 | 9/2021 | Nayyar et al. |
| 2021/0293948 A1 | 9/2021 | Peng et al. |

OTHER PUBLICATIONS

"Extended European Search Report", EP Application No. 21151688.5, dated Jul. 9, 2021, 8 pages.

"Method for Simulating an Antenna", EP Application No. 19183296, Filed Jun. 28, 2019, 45 pages.

"Notice of Allowance", U.S. Appl. No. 16/912,855, dated Aug. 16, 2021, 8 pages.

"Numerical Methods in FEKO White Paper Introduction", Dec. 15, 2016, 5 pages.

Chipengo, et al., "High Fidelity Physics Simulation of 128 Channel MIMO Sensor for 77GHz Automotive Radar", Sep. 2020, 10 pages.

Sjoberg, "EITN90 Radar and Remote Sensing Lecture 6: Target Fluctuation Models", Mar. 2018, 33 pages.

Yang, et al., "Novel Extension of SBR-PO Method for Solving Electrically Large and Complex Electromagnetic Scattering Problem in Half-Space", Jul. 2017, pp. 3931-3940.

"Extended European Search Reportr", EP Application No. 19183296.3, dated Jan. 3, 2020, 7 pages.

"Numerical Methods in FEKO—Altair White Paper", Retrieved at: https://resources.altair.com/resfile_web_path/file-en/Numercial_Methods_dec2016.pdf, Dec. 2016, 5 pages.

Chou, "Asymptotic High Frequency Methods", Novel Technologies for Microwave and Millimeter—Wave Applications, Springer, Jan. 2004, 36 pages.

Lacik, et al., "On Using Ray-Launching Method for Modeling Rotational Spectrometer", Jun. 2008, 10 pages.

Ling, et al., "Shooting and Bouncing Rays: Calculating the RCS of an Arbitrarily Shaped Cavity", Feb. 1989, pp. 194-205.

"Antenna Modeling Considerations", Retrieved at: http://tech.mweda.com/download/hwrf/hfss/HFSS-03_Antenna_Modeling_Considerations.pdf—on Dec. 3, 2021, 14 pages.

"Extended European Search Report", EP Application No. 21182855.3, dated Nov. 29, 2021, 9 pages.

"Non-Final Office Action", U.S. Appl. No. 16/825,170, dated Dec. 6, 2021, 22 pages.

Chopengo, et al., "From Antenna Design to High Fidelity, Full Physics Automotive Radar Sensor Corner Case Simulation", Aug. 2018, 20 pages.

Mauermayer, et al., "Combining the Fast Irregular Antenna Field Transformation Algorithm with Asymptotic High Frequency Methods", Aug. 2015, 4 pages.

POINT-SOURCE MODEL FOR SIMULATING NEAR-FIELD EFFECTS FROM STRUCTURES OF AN ANTENNA

BACKGROUND

Antennae are used in a variety of applications and configurations to transmit and receive electromagnetic signals, such as in radar systems to detect and track objects. Antenna arrays include a combination of active elements and passive elements to transmit and receive electromagnetic radiation, along with an antenna structure that can include a circuit board, a reflective surface, a ground plane, a radome, or an enclosure. Antenna arrays are often positioned near other structures (e.g., behind a vehicle bumper), with which the electromagnetic radiation from the active elements interacts. The antenna structure and interaction structures located within the near-field region of an antenna array materially impact the electromagnetic characteristics and performance of the antenna array.

To optimize the placement and configuration of an antenna for various applications, engineers simulate an antenna array and interaction structures in its vicinity. To perform these simulations, engineers often use full-wave simulation methods, which provide an accurate representation of the electromagnetic radiation from the antenna array and electromagnetic interactions with the antenna structure and interaction structures. Full-wave simulation methods solve the dense mesh models generated by the fine details of the antenna structure and the interaction structures. Solving these mesh models using full-wave simulation methods demands considerable computational resources and time. To avoid these high costs, some engineers use asymptotic numerical methods, which require less computation and time. These asymptotic numerical methods, however, cannot simulate electromagnetic interactions with the antenna structure and interaction structures positioned within the near-field region of the active elements.

SUMMARY

This document describes techniques and systems to generate a point-source model for simulating near-field effects from structures of an antenna. The techniques and systems generate, based on near-field values extracted from electromagnetic simulations, respective far-field radiation patterns for active elements and, in some cases, passive elements of the antenna array. The far-field radiation patterns account for electromagnetic interactions between the active elements and an antenna structure, which can include passive elements of the antenna array. The techniques and systems output the far-field radiation patterns, which are effective to simulate, using an asymptotic numerical method, electromagnetic interactions between the antenna array and at least one interaction structure. Using the described point-source model, engineers can quickly and accurately simulate electromagnetic interactions between the antenna array and the interaction structures for various configurations and applications of the antenna array.

For example, this document describes a method that generates a source model of an antenna array. The source model of the antenna array models active elements and an antenna structure of the antenna array. The described method simulates electromagnetic radiation fields radiated into space by the active elements and the electromagnetic interactions between the radiation fields and the antenna structure. The method then extracts, based on interactions of the electromagnetic radiation fields with the antenna structure, at least one near-field value for each of the active elements. The method generates, using a near-field-to-far-field transformation on the extracted near-field value, far-field radiation patterns for the respective active elements. The method outputs the far-field radiation patterns. The far-field radiation patterns are effective in simulating, using an asymptotic numerical method, electromagnetic interactions between the antenna array and interaction structures.

This document also describes computer-readable storage media having instructions for performing the above-summarized method and other methods set forth herein, as well as systems for performing these methods.

This summary introduces simplified concepts for generating a point-source model for simulating near-field effects from structures of an antenna array, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a point-source model for simulating near-field effects from structures of an antenna array are described in this document with reference to the following figures. The same numbers are often used throughout the drawings to reference like features and components.

DETAILED DESCRIPTION

Overview

Figure 1:
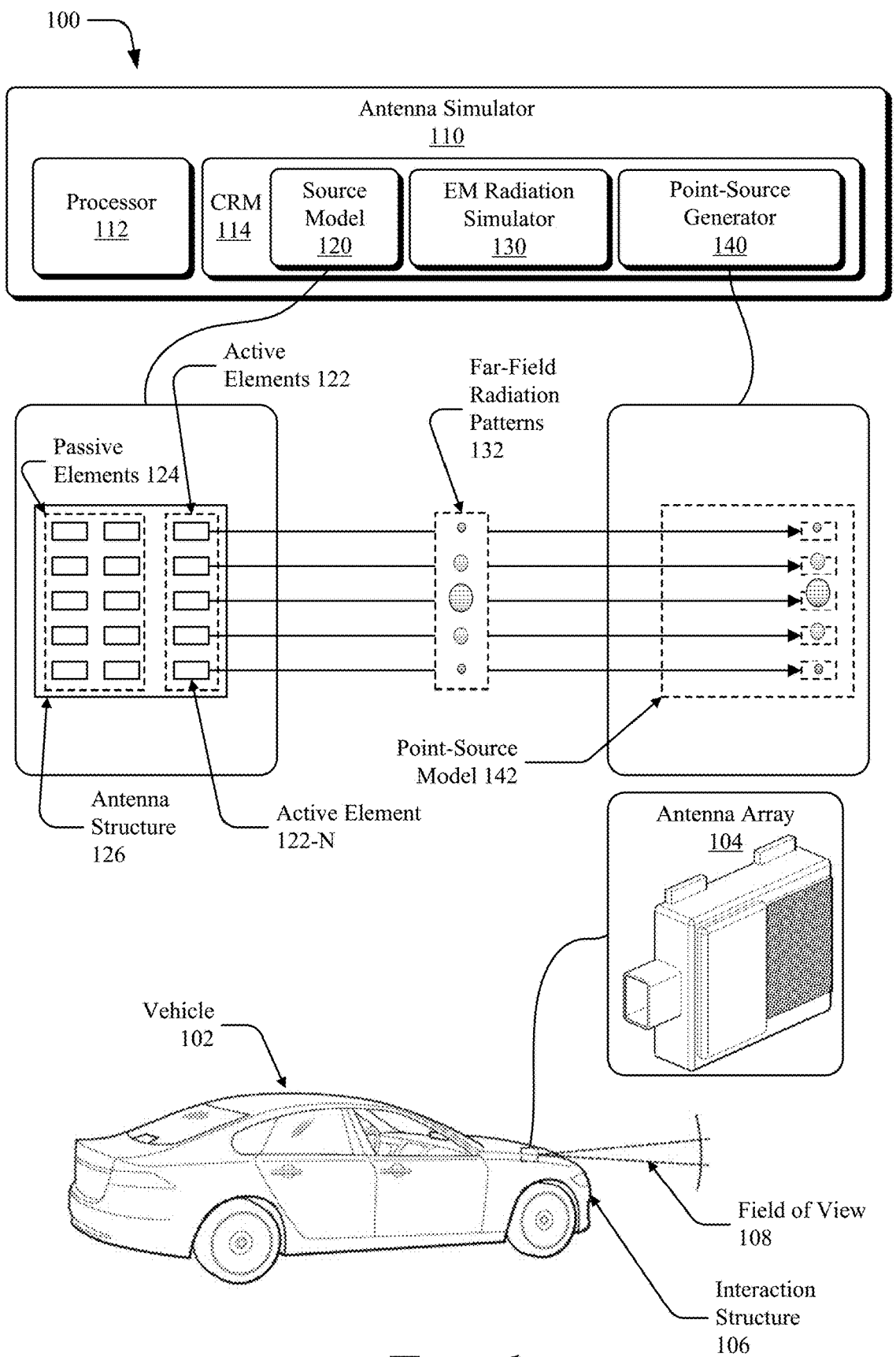
FIG. 1 illustrates an example environment in which an antenna simulator models one or more components of an antenna array and generates a point-source model for simulating near-field effects from an antenna structure.

This document describes techniques and systems to generate a point-source model for simulating near-field effects from structures of an antenna. The point-source model allows for more accurate and quicker simulations of the antenna array and electromagnetic interactions with interaction structures in the vicinity of the antenna array. The techniques and systems generate a source model that models active elements and an antenna structure of the antenna array. The antenna structure can include a ground plane, a reflecting surface, a circuit board, passive elements, an enclosure, and a radome. The techniques and systems then simulate, using the source model, electromagnetic radiation fields radiated into space and received by the antenna elements. In the simulation, the antenna structure is modeled at a position within the electromagnetic radiation fields of the active elements. The techniques and systems extract, based on interactions of the electromagnetic radiation fields with the antenna structure, at least one near-field value for each of the active elements. Based on a near-field-to-far-field transformation on the near-field value, the techniques and systems generate far-field radiation patterns for the active elements, respectively, and then outputs the far-field radiation patterns. The techniques and systems can also include far-field radiation patterns for the passive elements. The far-field radiation patterns are effective to quickly and accurately simulate electromagnetic interactions between the antenna array and the interaction structure for various configurations and applications of the antenna array.

Engineers use simulation tools to analyze the performance of an antenna array in various configurations and applications. Such simulations can utilize full-wave methods or asymptotic numerical methods. A full-wave simulation solves the complete set of Maxwell's equations without approximating or neglecting electromagnetic field components. In contrast, an asymptotic numerical method describes electromagnetic radiation in terms of rays or ray fields. It approximates the interaction of the electromagnetic radiation with structures by reflection, diffraction, and the like. Asymptotic numerical methods are generally designed to simulate electromagnetic interactions with structures placed in the far-field region of an antenna array and cannot easily model structures, such as the antenna structure or interaction structures, that are positioned in the near-field.

By way of example, consider a radar device used to detect and track objects in a driver-assistance system. Automobile manufacturers often install antenna arrays of such radar devices close to vehicle structures (e.g., behind a bumper, headlight, or exterior panel). To determine the performance and optimum placement of the radar device, engineers may simulate the electromagnetic interactions of the radar antenna array with vehicle structures in different locations on a particular vehicle for a multitude of vehicles. Such simulations must account for the intricate features of the antenna structure and the vehicle structures to improve their accuracy. A conventional full-wave simulation creates a fine mesh at the antenna structure and the vehicle structures. Simulation of these meshes demands tremendous computational resources. The necessary resources and time to run the simulations exponentially increase as engineers run multiple simulations. In contrast, a conventional asymptotic numerical method cannot adequately model and simulate the complexities of the antenna structure positioned within the near-field region of the radar antenna array. In addition, if engineers use a conventional asymptotic numerical method to simulate electromagnetic interactions between the radar antenna array and the vehicle structures, the simulation uses an idealized radiation pattern for the active elements without accounting for electromagnetic interactions with, and reflective radiation from, the antenna structure, including the passive elements.

The described point-source model provides more-accurate and computationally-efficient techniques and systems to simulate the electromagnetic interactions between the radar antenna array and vehicle structures. The techniques and systems generate a source model of the active elements and the antenna structure of the radar device, which can include the passive elements. The techniques and systems then simulate electromagnetic radiation fields radiated into space by the active elements and extract at least one near-field value for each active element. In some cases, the techniques and systems also extract at least one near-field value for each passive element. The near-field values account for the interactions of the electromagnetic radiation fields with the antenna structure, thereby providing a more accurate representation of the electromagnetic characteristics and performance of the radar device. The techniques and systems generate a far-field radiation pattern from the near-field values for each of the active elements and passive elements, if appropriate. The techniques and systems output the far-field radiation patterns, which can be used to simulate, using an asymptotic numerical method, interactions between the radar device and vehicle structures. Accordingly, the described techniques and systems generate accurate far-field representations of the active elements and passive elements for a radar device. The described techniques and systems reduce the computational cost to simulate the radar device in various locations behind the bumper of a particular vehicle or multiple vehicles when compared to a full-wave simulation method. The simulation time is reduced from several hours or days to tens of minutes for each simulation. The asymptotic numerical method can also accurately simulate, using the described point-source model, multilayered interaction structures (e.g., painted bumpers) or multiple interaction structures (e.g., bumpers, fog lights, license plates) without adding significant computational costs.

The described techniques and systems to generate a point-source model for simulating near-field effects from structures of a radar antenna array is just one example of a way in which to reduce the computational resources and time required to accurately simulate interactions between an antenna array and an interaction structure. Other example techniques and systems are described throughout this document. This document now describes example operating environments and an example method.

Operating Environment

FIG. 1 illustrates an example environment 100 in which an antenna simulator 110 generates a point-source model 142 for an antenna array 104. The antenna array 104 is mounted to, or integrated within, a vehicle 102. Although illustrated as a car, the vehicle 102 can represent other types of motorized vehicles (e.g., a truck, a motorcycle, a bus, a tractor, a semi-trailer truck, construction equipment), non-motorized vehicles (e.g., a bicycle), railed vehicles (e.g., a train), watercraft (e.g., a boat), aircraft (e.g., an airplane, a helicopter), or spacecraft (e.g., a satellite). The antenna array 104 can also be mounted to, or integrated within, other structures, such as communication network towers, buildings, electronic devices, robotic equipment, and the like.

The antenna array 104 can be a planar array that provides high gain and low loss. Planar arrays are well suited for vehicle integration due to their small size and depth. For example, the antenna array 104 can include one or more patch antenna subarrays (e.g., microstrip patch antenna subarrays) or slot antenna subarrays (e.g., slotted waveguide antenna subarrays).

In the environment 100, the antenna array 104 is mounted near the front of the vehicle 102 behind an interaction structure 106. In other implementations, automobile manufacturers can mount the antenna array 104 on or near the top, underside, rear center, rear sides, left side, or right side of the vehicle 102. The antenna array 104 is positioned to provide a particular field of view 108 that encompasses a region of interest.

The antenna array 104 emits electromagnetic radiation by transmitting one or more electromagnetic signals or waveforms via active elements 122. In the environment 100, the antenna array 104 is a radar device that can detect and track objects by transmitting one or more radar signals. As an example, antenna array 104 can transmit electromagnetic signals between 100 and 400 gigahertz (GHz), between 4 and 100 GHz, or between approximately 70 and 80 GHz. In other cases, antenna array 104 can be a fifth-generation (5G) wireless technology antenna, a 60-GHz wireless network antenna, a Ka-band antenna, or a dedicated short-range communication antenna.

In this implementation, the interaction structure 106 is a front bumper of the vehicle 102. In other cases, the interaction structure 106 can include additional vehicle structures (e.g., a license plate, a headlight structure, a fog light, a fender, an exterior panel) or sensors (e.g., an ultrasonic sensor, a Lidar antenna). In general, the interaction structure 106 is a structure within the field of view 108 of the antenna array 104. More than one interaction structure 106 can be placed within the field of view 108.

The antenna simulator 110 includes at least one processor 112 and computer-readable storage media 114. The computer-readable storage media 114 includes memory media and storage media. Applications and an operating system (not shown) implemented as computer-readable instructions on the computer-readable storage media 114 can be executed by the processor 112 to provide some or all of the functionalities described below. In the depicted configuration, the computer-readable storage media 114 includes a source model 120, an electromagnetic radiation simulator 130, and a point-source generator 140. The source model 120, the electromagnetic radiation simulator 130, and the point-source generator 140 can be implemented using hardware, software, firmware, or a combination thereof. Together, the source model 120, the electromagnetic radiation simulator 130, and the point-source generator 140 enable the antenna simulator 110 to simulate the antenna array 104, as further described below.

The point-source model 142, which is generated by the point-source generator 140, provides an accurate evaluation of the electromagnetic characteristics and performance of the antenna array 104 by accounting for the impact of an antenna structure 126 on the antenna array 104. To determine the performance and optimum placement of the antenna array 104 within the vehicle 102, the point-source model 142 allows engineers to simulate the electromagnetic interactions of the antenna array 104 with the interaction structure 106. Engineers may also use the point-source model 142 to quickly and accurately simulate the performance of the antenna array 104 on different vehicles with various interaction structures 106. The antenna simulator 110 enables problems integrating the antenna array 104 onto the vehicle 102 to be discovered during design, integration, and testing phases.

The source model 120 models at least two active elements 122 and the antenna structure 126 of the antenna array 104. The active elements 122 and the antenna structure 126 are representative of the antenna array 104 and defined with electromagnetic properties for their respective surfaces and volumes. In the context of this document, an active element 122 refers to a simulated antenna element of the antenna array 104 that radiates electromagnetic radiation. For example, the active elements 122 include a subset of elements in the transmitter of the antenna array 104 that radiate electromagnetic radiation at approximately the same time. The source model 120 includes N active elements 122, where N represents a positive integer. The active elements 122 can be configured in an array or as individual elements of one or more sub arrays. For example, the active elements 122 can be individual patch elements of one or more planar microstrip patch antenna subarrays, individual slot elements of one or more slotted waveguide antenna subarrays, or individual dipole elements of one or more dipole antenna sub arrays.

The active elements 122 can each have dimensions such that the interaction structure 106 is placed in the far-field region of the individual active elements 122. Additionally, the antenna array 104 as a whole can have dimensions such that the interaction structure 106 is placed in the near-field region of the antenna array 104. In such cases, the antenna simulator 110 accurately represents the active elements 122 by far-field sources in the point-source model 142, while a single far-field source may not be used to accurately represent interactions between the antenna array 104 and the interaction structure 106.

In the context of this document, the far-field region of a radiating structure (e.g., the active element 122-N) or a reflecting structure (e.g., the passive elements 124) is defined by the area in which the electromagnetic fields are dominated by radiating fields. In the far-field region, the electric-field components and magnetic-field components are orthogonal to each other and the propagation direction. The far-field region generally starts at a distance d from the radiating structure or reflecting structure that is larger than $2D^2/\lambda$, where D is the maximum transverse dimension of the radiating structure, and $\lambda$ is the wavelength of the emitted radiation. The region within the distance d from the radiating structure or the reflecting structure is generally considered the near-field region.

The antenna structure 126 can include a surface, a circuit board, a ground plane, a radome, an enclosure, or other elements of the antenna array 104. The other elements can include passive elements 124, which in the context of this document include antenna elements of a receiver of the antenna array 104 or non-radiating elements of a transmitter of the antenna array 104. The passive elements 124 receive reflected versions of the radiated electromagnetic fields and can include M passive elements 124, where M represents a positive integer. The number of active elements 122 (N) and passive elements 124 (M) can be the same or different. The number of subarrays in the transmitter of the antenna array 104 can also be the same or different as the number of subarrays in the receiver. In addition, the number of individual elements within each of the subarrays can be the same or different.

The circuit board is the printed circuit board or similar component on which the active elements 122 and passive elements 124 are printed. The ground plane can comprise a horizontal conducting surface that reflects electromagnetic radiation. The radome can be a dielectric enclosure placed in front of the active elements 122 and the passive elements 124 to protect the antenna array 104. The radome can be modeled to include the air between the radome and the active elements 122 and the passive elements 124. The enclosure can include the radome or any other protective structure placed in front of the active elements 122 and the passive elements 124.

In the case of a patch antenna array, the antenna structure 126 can represent the ground plane of the antenna array 104 and the dielectric material placed between the ground plane and the individual patch active elements 122 and the individual patch passive elements 124 of the antenna array 104. In the case of a slot antenna array, the antenna structure 126 can represent a metallic slotted electrode layer containing slots for the active elements 122 and the passive elements 124. In both cases, the antenna structure 126 can additionally represent the dielectric radome of the antenna array 104 placed in front of the active elements 122 and the passive elements 124.

Components of the antenna structure 126 can reflect incoming radiation at the individual material layers, such as material layers of the radome and the ground plane. The incoming radiation can be a part of the electromagnetic radiation emitted by the active elements 122 that is scattered back towards the active elements 122 and the passive elements 124 by other components of the antenna structure 126. The source model 120 models any component or surface of the antenna array 104 that reflects, refracts, deflects, diffracts, or scatters incoming radiation, such as an electrode layer or a structure containing the active elements 122.

The electromagnetic radiation simulator 130 simulates the electromagnetic radiation fields radiated into space by the active elements 122. In particular, the electromagnetic radiation simulator 130 can perform operations that simulate waveform generation operations performed by the antenna array 104.

In these simulations, the antenna structure 126 is positioned within the electromagnetic radiation fields of the active elements 122. The simulations evaluate the propagation and scattering effects of the electromagnetic radiation fields, including interactions with and reflections from the antenna structure 126. The electromagnetic radiation simulator 130 can evaluate radiation that originates from the active elements 122 and returns to the active elements 122 within the source model 120.

The electromagnetic radiation simulator 130 can simulate the electromagnetic radiation fields using any suitable simulation method, such as a full-wave simulation method, a boundary element method, or a method of moments. As discussed above, the antenna array 104 used in an automotive application can be a planar array like a microstrip patch or slot antenna array and can contain combinations of the active elements 122. Additionally, the antenna structure 126 often features complex dielectric or metallic structures in the vicinity of the active elements 122. Because the antenna structure 126 is usually placed in the near-field of the active elements 122, engineers cannot easily model the antenna structure 126 using asymptotic numerical approximations designed for the far-field region. As a result, if the antenna array 104 is simulated, engineers usually use full-wave field solvers.

The point-source generator 140 then extracts, based on interactions of the electromagnetic radiation fields with the antenna structure 126, at least one near-field value for each of the active elements 122. The point-source generator 140 uses the near-field value to generate a near-field distribution pattern for each of the active elements 122. Because the electromagnetic radiation simulator 130 simulates the interactions of the electromagnetic radiation fields from each of the active elements 122 with the antenna structure 126, the extracted near-field value provides an accurate representation of the electromagnetic radiation performance for each of the active elements 122.

The point-source generator 140 then generates far-field radiation patterns 132 for the active elements 122, respectively. The far-field radiation patterns 132 are based on a near-field-to-far-field transformation on the near-field value for the respective active elements 122. Near-field-to-far-field transformations provide an equivalent far-field radiation pattern of the active elements 122 from the extracted near-field value. The antenna simulator 110 can perform the near-field-to-far-field transformation using any known techniques or methods, such as using a modal expansion method with flat-plane, cylindrical, or spherical scanning.

The point-source generator 140 outputs the far-field radiation patterns 132 as part of the point-source model 142. The far-field radiation patterns 132 are effective in simulating electromagnetic interactions between the antenna array 104 and at least one interaction structure 106. The far-field radiation patterns 132 provide an accurate point-source representation of the radiation patterns of the individual active elements 122, including the electromagnetic effects caused by the interaction of the active elements 122 with the antenna structure 126. The far-field radiation patterns 132 can define the direction, the number, or the intensity of rays or ray fields emerging from the active elements 122. The point-source model 142 can be used to simulate electromagnetic interactions between the antenna array 104 and the interaction structure 106, as further described with respect to FIG. 2.

In other cases, the electromagnetic radiation simulator 130 simulates the electromagnetic radiation fields radiated into space by the active elements 122, which represent a subset of the elements in the transmitter of the antenna array 104. The antenna simulator 110 then performs the operations described above to generate a point-source model 142 for each set of active elements 122 within the transmitter. For example, if the antenna array 104 activates half of the elements in the transmitter at approximately the same time and subsequently activates the other half of the elements in the transmitter at approximately the same time, the antenna simulator 110 generates two point-source models 142 to simulate the near-field effects from the antenna structure 126.

Figure 2:
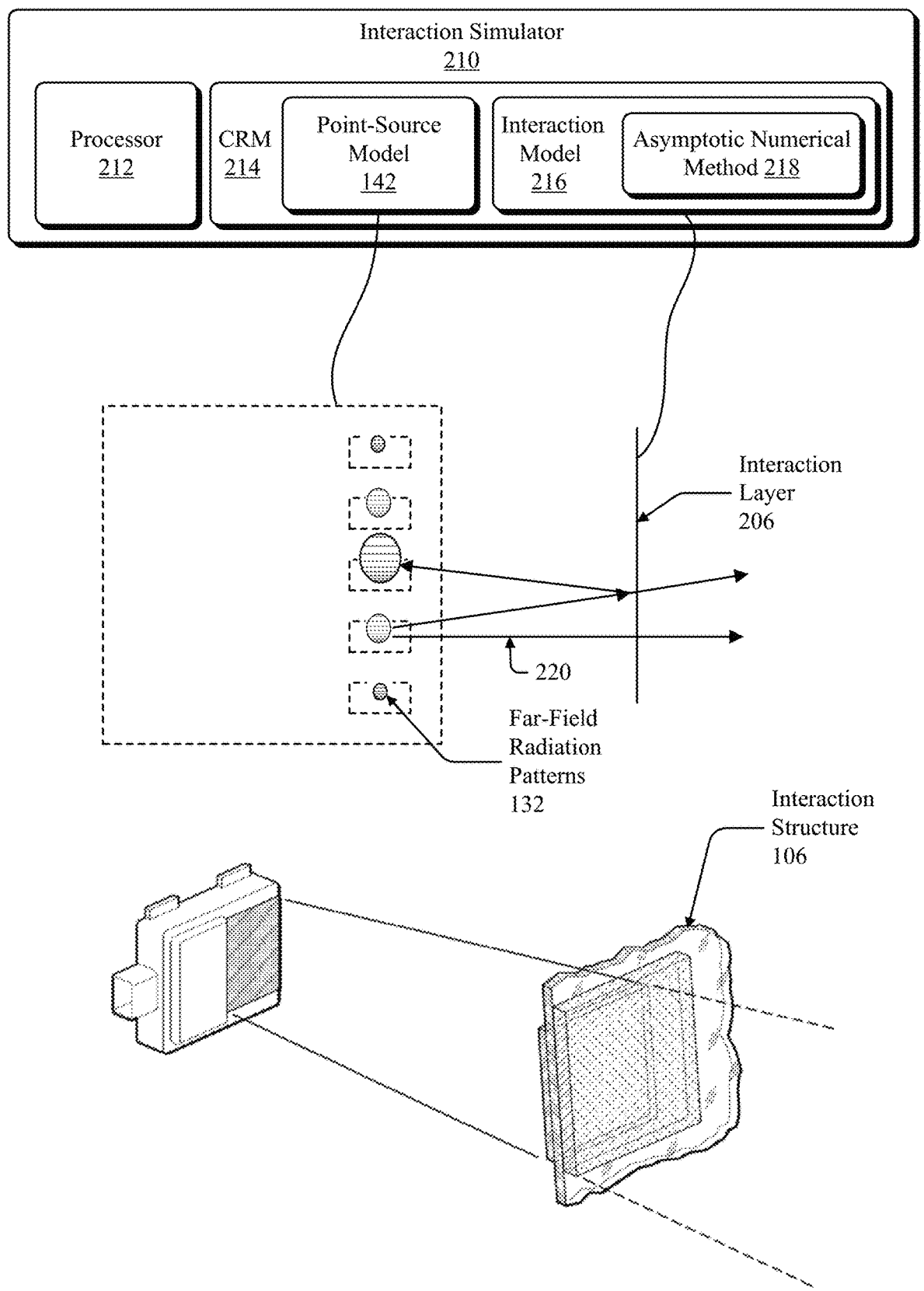
FIG. 2 illustrates an example interaction simulator that simulates, using a point-source model, electromagnetic interactions between an antenna array and an interaction structure.

FIG. 2 illustrates an example interaction simulator 210 that simulates the electromagnetic interactions between the antenna array 104 and the interaction structure 106. As described with respect to FIG. 1, the antenna simulator 110 models the active elements 122 and antenna structure 126 of the antenna array 104 to generate the point-source model 142. The interaction simulator 210 simulates electromagnetic interactions between the far-field radiation patterns 132 of the point-source model 142 and the interaction structure 106.

The interaction simulator 210 includes at least one processor 212 and computer-readable storage media 214. The computer-readable storage media 214 includes memory media and storage media. Applications and an operating system (not shown) implemented as computer-readable instructions on the computer-readable storage media 214 can be executed by the processor 212 to provide some or all of the functionalities described herein, such as the functions of the interaction simulator 210. The processor 212 can be the same component as the processor 112 or be a different component included in the same computing system as the processor 112 or in a different computing system. Similarly, the computer-readable storage media 214 can be the same component as the computer-readable storage media 114 or be a different component included in the same computing system as the computer-readable storage media 114 or in a different computing system. The computer-readable storage media 214 also includes an interaction model 216, which models the interaction structure 106 as an interaction layer 206.

The interaction simulator 210 loads the point-source model 142, which includes the far-field radiation patterns 132, into the computer-readable storage media 214. The far-field radiation patterns 132 are used as an equivalent field source in the interaction simulator 210 to simulate the electromagnetic interactions between the antenna array 104 and the interaction structure 106. The far-field radiation patterns 132 represent an excitation source within the interaction simulator 210. The far-field radiation patterns 132 can represent point-sources in which the far-field radiation patterns 132 originate from a single, infinitesimally small source location.

The interaction simulator 210 performs the simulation of the electromagnetic interactions using an asymptotic numerical method 218. The asymptotic numerical method 218 simulates the far-field radiation patterns 132 as the rays or ray fields 220, which are propagated in a radiation direction in front of the antenna array 104. Engineers generally use the asymptotic numerical method 218 to simulate scattering problems involving electrically large interaction structures. Electrically large structures are structures with dimensions that are larger than the wavelength of the electromagnetic radiation. For example, the interaction layer 206 has a transverse dimension that is at least ten times the wavelength of the emitted electromagnetic radiation of the antenna array 104. Physical effects of the rays or ray fields 220 at the boundaries of the interaction structure 106 are modeled by computing equivalent currents from the tangential fields that impinge on the interaction layer 206 and by determining rays that are reflected, refracted or transmitted by the interaction layer 206 from the determined equivalent currents.

The asymptotic numerical method 218 can be a ray-launching (RL) method, a geometrical optics (GO) method, a ray-launching geometrical optics (RL-GO) method, a physical optics method, a geometrical theory of diffraction method, or a physical theory of diffraction method. For example, the interaction simulator 210 can use a shooting-and-bouncing-rays (SBR) method, which is a type of RL-GO method. In an SBR method, the electromagnetic radiation incident on the interaction layer 206 is represented by rays that are traced using geometrical optics and the interaction of the individual rays with the interaction layer 206 is determined using physical optics by performing an integration covering the intersection of the individual rays with the surface.

Engineers may use the interaction simulator 210 to determine the optimum mounting position of the antenna array 104 behind the interaction structure 106. For example, engineers may use the interaction simulator 210 to vary the pose of the antenna array 104 (e.g., position, orientation) with respect to the interaction structure 106 and simulate the electromagnetic performance of the antenna array 104 for each pose. Similarly, engineers may use the interaction simulator 210 to verify that the antenna array 104 satisfies a pre-described design goal, such as not exceeding a maximum distortion limit or performance degradation limit, for a particular configuration.

Figure 3:
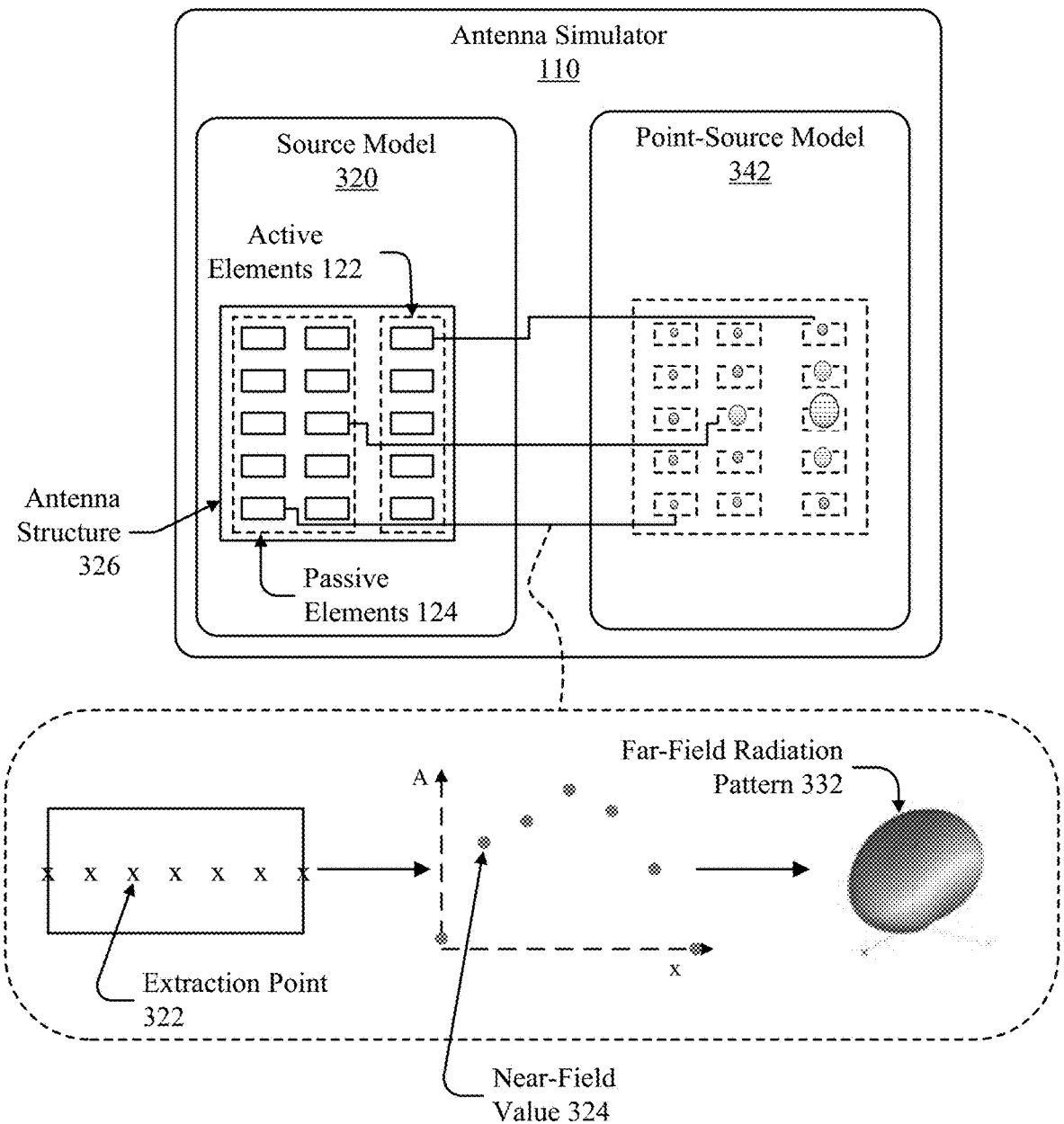
FIG. 3 illustrates an example antenna simulator that models active elements and passive elements of an antenna array and generates a point-source model.

FIG. 3 illustrates the antenna simulator 110 that models the active elements 122 and the passive elements 124 to generate a point-source model 342 for the antenna array 104. A source model 320 models an antenna structure 326 to include at least the passive elements 124, which are included in the point-source model 342 as passively-radiating elements. The antenna structure 326 is similar to the antenna structure 126 but includes additional detail.

Similar to the example in FIG. 1, the electromagnetic radiation simulator 130 simulates electromagnetic radiation fields radiated into space by the active elements 122 of the source model 320. The point-source generator 140 then extracts seven near-field values 324 for each active element 122. The near-field values 324 can include amplitude and phase values. In some cases, the point-source generator 140 extracts additional near-field values 324 for each of the active elements 122.

In this example, the point-source generator 140 also extracts seven near-field values 324 for each of the passive elements 124 of the source model 320. As discussed above, the passive elements 124 can include the elements in the receiver of the antenna array 104 or the non-radiating elements of the transmitter of the antenna array 104. In the electromagnetic radiation simulator 130, the passive elements 124 can, directly and indirectly, reflect the electromagnetic radiation fields emitted by the active elements 122. The passive elements 124 are generally made of reflective material that reflects the simulated electromagnetic radiation fields. As an example, the electromagnetic radiation fields radiated into space by the active elements 122 can reflect off of the radome and then reflect off the passive elements 124. The passive elements 124 can also directly reflect the electromagnetic radiation fields of the active elements 122. As a result, the passive elements 124 act as indirect radiation elements of the antenna array 104. By extracting the near-field values 324 for each receiver element 124, the point-source generator 140 accounts for the mutual-coupling effects of the passive elements 124 on the electromagnetic characteristics and performance of the antenna array 104. To extract the near-field values 324 of the passive elements 124, engineers are not required to perform an additional simulation of the source model 320, by the electromagnetic radiation simulator 130, because they can extract the near-field values of both the active elements 122 and the passive elements 124 from the same simulation.

For each of the active elements 122 and the passive elements 124, the point-source generator 140 extracts seven near-field values 324 at extraction points 322 to generate a distribution of phase and amplitude. In other cases, the point-source generator 140 can extract a greater or smaller number of near-field values 324. The point-source generator 140 can extract the near-field values 324 from the extraction points 322 at various transverse locations within each of the active elements 122 and each of the passive elements 124.

The point-source generator 140 then generates far-field radiation patterns 332 for the active elements 122 and the passive elements 124, respectively. The far-field radiation patterns 332 are generated based on a near-field-to-far-field transformation on the near-field values 324 for the active elements 122 and the passive elements 124.

The antenna simulator 110 outputs the point-source model 342, which comprises the far-field radiation patterns 332 of the active elements 122 and the far-field radiation patterns 332 of the passive elements 124. The point-source model 342 provides an accurate representation of the radiation patterns of the antenna array 104 that accounts for the mutual-coupling effects of the passive elements 124.

Example Method

Figure 4:
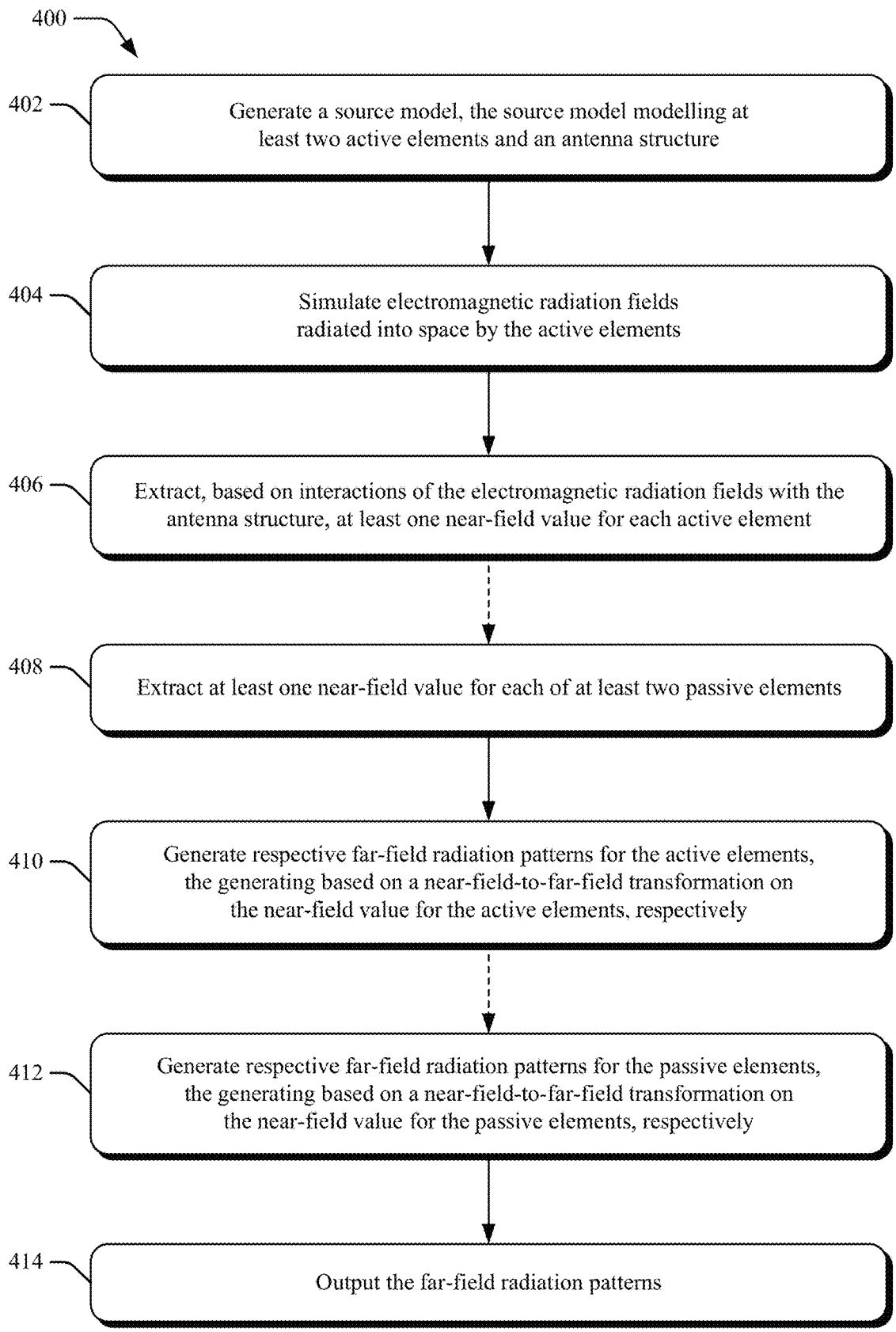
FIG. 4 illustrates an example method performed by an antenna simulator to generate a point-source model.

FIG. 4 depicts an example method 400 for generating a point-source model 142 of the antenna array 104. Method 400 is shown as a set of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1 and entities detailed in FIGS. 2 and 3, reference to which is made for example only. The techniques are not limited to performance by one entity or multiple entities.

At 402, a source model is generated. The source model models at least two active elements and an antenna structure. For example, the antenna simulator 110 generates a source model 120 of the antenna array 104. The source model 120 models at least two active elements 122 and an antenna structure 126 of the antenna array 104. As described above with respect to FIG. 1, the antenna structure 126 can comprise a surface, a circuit board, a ground plane, the passive elements 124, a radome, an enclosure, or other elements of the antenna array 104.

At 404, the active elements are simulated to radiate electromagnetic radiation fields into space. For example, the electromagnetic radiation simulator 130 simulates electromagnetic radiation fields radiated into space by the active elements 122 of the source model 120, as shown in FIG. 1. The antenna structure 126 is modeled at a position within the electromagnetic radiation fields of the active elements 122.

At 406, at least one near-field value for each active element is extracted. The extraction is based on interactions of the electromagnetic radiation fields with the antenna structure. For example, the point-source generator 140 extracts at least one near-field value 324 for each active element 122, as shown in FIG. 3. Each near-field value 324 is associated with a particular position or extraction point 322 on the associated active element 112. The extraction of the near-field value is based on interactions of the electromagnetic radiation fields with the antenna structure 126.

Optionally at 408, at least one near-field value for each passive element is extracted. For example, the point-source generator 140 can also extract at least one near-field value 324 for each of the passive elements 124 of the source model 120, as shown in FIG. 3. The near-field values 324 correspond to different extraction points 322 within the associated passive element 124.

At 410, far-field radiation patterns are generated for the active elements. The far-field radiation patterns are generated based on a near-field-to-far-field transformation on the near-field value for the active elements, respectively. For example, the point-source generator 140 generates far-field radiation patterns 332 for the active elements 122, respectively, as shown in FIG. 3. The far-field radiation patterns 332 are generated based on a near-field-to-far-field transformation on the near-field value for the active elements 122, respectively.

Optionally at 412, the far-field radiation patterns are generated for the passive elements. The far-field radiation patterns are generated based on a near-field-to-far-field transformation on the near-field value for the passive elements, respectively. For example, the point-source generator 140 generates the far-field radiation patterns 332 for the passive elements 124, respectively, as shown in FIG. 3. This can be in response to the point-source generator 140 extracting the near-field value 324 for each of the passive elements 124 at 408. The far-field radiation patterns 332 are generated based on a near-field-to-far-field transformation on the near-field value for the passive elements 124, respectively.

At 414, the far-field radiation patterns are outputted. For example, the point-source generator 140 outputs the far-field radiation patterns 332 of the active elements 122 and, if extracted, the far-field radiation patterns 332 of the passive elements 124 as point-source model 342. The far-field radiation patterns 332 of the active elements 122 and the far-field radiation patterns 332 of the passive elements 124 are represented by the point-source model 342 of FIG. 3. The far-field radiation patterns 332 are effective to simulate, using an asymptotic numerical method, electromagnetic interactions between the antenna array 104 and at least one interaction structure 106, as described in FIG. 2. The interaction structure 106 can have dimensions that place it in the near-field of the antenna array 104 and the far-field of the individual active elements 122. The asymptotic numerical method simulates the far-field radiation patterns 332 as rays or ray fields. The asymptotic numerical method can propagate the rays or ray fields in a radiation direction in front of the antenna array 104.

Examples

In the following section, examples are provided.

Example 1: A method for generating a point-source model for an antenna array comprising: generating a source model, the source model modeling at least two active elements of the antenna array and an antenna structure of the antenna array; simulating electromagnetic radiation fields radiated into space by the active elements, the simulating based on the antenna structure modeled at a position within the electromagnetic radiation fields; extracting, based on interactions of the electromagnetic radiation fields with the antenna structure, at least one near-field value for each of the active elements; generating far-field radiation patterns for each of the active elements, the generating based on a near-field-to-far-field transformation on the near-field value for the respective active elements; and outputting the far-field radiation patterns, the far-field radiation patterns effective to simulate, using an asymptotic numerical method, electromagnetic interactions between the antenna array and at least one interaction structure, the asymptotic numerical method simulating the far-field radiation patterns as rays or ray fields.

Example 2: The method of example 1, wherein the antenna structure of the source model comprises at least one of a surface of the antenna array, a circuit board of the antenna array, a ground plane of the antenna array, a radome of the antenna array, an enclosure of the antenna array, or passive elements of the antenna array.

Example 3: The method of example 2, wherein the antenna structure comprises at least two passive elements and at least one of the surface, the circuit board, the ground plane, the radome, or the enclosure; the method further comprising: extracting, based on interactions of the electromagnetic radiation fields with the antenna structure, at least one near-field value for each of the passive elements; and generating far-field radiation patterns for each of the passive elements respectively, the generating based on a near-field-to-far-field transformation on the near-field value for the respective passive elements; and wherein the outputting of the far-field radiation patterns comprises outputting the far-field radiation patterns of the active elements and the far-field radiation patterns of the passive elements.

Example 4: The method of example 3, wherein the active elements comprise a first subset of the elements in a transmitter of the antenna array, the other elements in the transmitter comprise a second subset of elements; wherein the antenna structure comprises the second subset of elements as passive elements in the source model; and the method further comprising generating another point-source model for the antenna array with the second subset of elements modeled as the active elements in another source model and the first subset of elements modeled as passive elements in the other source model.

Example 5: The method of example 3, wherein the extracting of the at least one near-field value for the active elements and the at least one near-field value for the passive elements extracts at least seven near-field values for each of the active elements and at least seven near-field values for each of the passive elements.

Example 6: The method of example 1, wherein the active elements comprise patch elements of one or more patch antenna subarray, slot elements of one or more slot antenna subarray, or dipole elements of one or more dipole antenna subarray.

Example 7: The method of example 6, wherein the antenna array comprises a radar antenna, a fifth-generation (5G) wireless technology antenna, a 60-Gigahertz wireless network antenna, a Ka-band antenna, or a short-range communication antenna.

Example 8: The method of example 1, wherein the asymptotic numerical method comprises a ray-launching method, a geometrical optics method, a ray-launching geometrical optics method, a physical optics method, a geometrical theory of diffraction method, or a physical theory of diffraction method.

Example 9: The method of example 1, wherein the simulating of the electromagnetic radiation fields radiated into space by the active elements comprises performing a full-wave simulation method that solves for a complete set of Maxwell's equations.

Example 10: The method of example 1, further comprising: simulating, using the asymptotic numerical method, the far-field radiation patterns as rays or ray fields radiated into space; and determining interactions of the rays or ray fields with the at least one interaction structure.

Example 11: A computer-readable storage media comprising computer-executable instructions for generating a point-source model for an antenna array that, when executed, cause a processor of a computing device to: generate a source model, the source model modeling at least two active elements of the antenna array and an antenna structure of the antenna array; simulate electromagnetic radiation fields radiated into space by the active elements, the simulating based on the antenna structure modeled at a position within the electromagnetic radiation fields; extract, based on interactions of the electromagnetic radiation fields with the antenna structure, at least one near-field value for each of the active elements; generate far-field radiation patterns for each of the active elements, the generating based on a near-field-to-far-field transformation on the near-field value for the respective active elements; and output the far-field radiation patterns, the far-field radiation patterns effective to simulate, using an asymptotic numerical method, electromagnetic interactions between the antenna array and at least one interaction structure, the asymptotic numerical method simulating the far-field radiation patterns as rays or ray fields.

Example 12: The computer-readable storage media of example 11, wherein the antenna structure of the source model comprises at least one of a surface of the antenna array, a circuit board of the antenna array, a ground plane of the antenna array, a radome of the antenna array, an enclosure of the antenna array, or passive elements of the antenna array.

Example 13: The computer-readable storage media of example 12, wherein: the antenna structure comprises at least two passive elements and at least one of the surface, the circuit board, the ground plane, the radome, or the enclosure; and the computer-executable instructions, when executed, further cause the processor of the computing device to: extract, based on interactions of the electromagnetic radiation fields with the antenna structure, at least one near-field value for each of the passive elements; and generate far-field radiation patterns for each of the passive elements respectively, the generating based on a near-field-to-far-field transformation on the near-field value for the respective passive elements; and output the far-field radiation patterns of the active elements and the far-field radiation patterns of the passive elements.

Example 14: The computer-readable storage media of example 13, wherein the computer-executable instructions, when executed, further cause the processor of the computing device to extract at least seven near-field values for each of the active elements and at least seven near-field values for each of the passive elements.

Example 15: The computer-readable storage media of example 11, wherein the active elements comprise patch elements of one or more patch antenna subarray, slot elements of one or more slot antenna subarray, or dipole elements of one or more dipole antenna subarray.

Example 16: The computer-readable storage media of example 15, wherein the antenna array comprises a radar antenna, a fifth-generation (5G) wireless technology antenna, a 60-Gigahertz wireless network antenna, a Ka-band antenna, or a short-range communication antenna.

Example 17: The computer-readable storage media of example 11, wherein the asymptotic numerical method comprises a ray-launching method, a geometrical optics method, a ray-launching geometrical optics method, a physical optics method, a geometrical theory of diffraction method, or a physical theory of diffraction method.

Example 18: The computer-readable storage media of example 11, wherein the computer-executable instructions, when executed, further causes the processor of the computing device to perform a full-wave simulation method that solves a complete set of Maxwell's equations.

Example 19: The computer-readable storage media of example 11, wherein the computer-executable instructions, when executed, further cause the processor of the computing device or another processor of another computing device to: simulate, using the asymptotic numerical method, the far-field radiation patterns as rays or ray fields radiated into space; and determine interactions of the rays or ray fields with the at least one interaction structure.

Example 20: A system for generating a point-source model for an antenna array comprising: means for generating a source model, the source model modeling at least two active elements of the antenna array and an antenna structure of the antenna array; means for simulating electromagnetic radiation fields radiated into space by the active elements, the simulating based on the antenna structure modeled at a position within the electromagnetic radiation fields; means for extracting, based on interactions of the electromagnetic radiation fields with the antenna structure, at least one near-field values for each of the active elements; means for generating far-field radiation patterns for each of the active elements, the generating based on a near-field-to-far-field transformation on the near-field value for the respective active elements; and means for outputting the far-field radiation patterns, the far-field radiation patterns effective to simulate, using an asymptotic numerical method, electromagnetic interactions between the antenna array and at least one interaction structure, the asymptotic numerical method simulating the far-field radiation patterns as rays or ray fields.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method for generating a point-source model for an antenna array comprising:

generating a source model, the source model modeling at least two active elements of the antenna array and an antenna structure of the antenna array, the antenna structure comprising at least two passive elements and at least one of a surface of the antenna array, a circuit board of the antenna array, a ground plane of the antenna array, a radome of the antenna array, or an enclosure of the antenna array;

simulating electromagnetic radiation fields radiated into space by the active elements, the simulating based on the antenna structure modeled at a position within the electromagnetic radiation fields;

extracting, based on interactions of the electromagnetic radiation fields with the antenna structure, at least seven near-field values for each of the active elements and for each of the passive elements;

generating far-field radiation patterns for each of the active elements and the passive elements, respectively, the generating based on a near-field-to-far-field transformation on the near-field value for the respective active elements and the respective passive elements; and outputting the far-field radiation patterns of the active elements and the passive elements, the far-field radiation patterns effective to simulate, using an asymptotic numerical method, electromagnetic interactions between the antenna array and at least one interaction structure, the asymptotic numerical method simulating the far-field radiation patterns as rays or ray fields.

2. The method of claim 1, wherein the antenna structure of the source model further comprises the surface of the antenna array, the circuit board of the antenna array, and the radome of the antenna array.

3. The method of claim 1,
wherein the active elements comprise a first subset of the elements in a transmitter of the antenna array and the passive elements comprise a second subset of elements in the transmitter; and the method further comprising generating another point-source model for the antenna array with the second subset of elements modeled as the active elements in another source model and the first subset of elements modeled as the passive elements in the other source model.

4. The method of claim 1, wherein the active elements comprise patch elements of one or more patch antenna subarray, slot elements of one or more slot antenna subarray, or dipole elements of one or more dipole antenna subarray.

5. The method of claim 4, wherein the antenna array comprises a radar antenna, a fifth-generation (5G) wireless technology antenna, a 60-Gigahertz wireless network antenna, a Ka-band antenna, or a short-range communication antenna.

6. The method of claim 1, wherein the asymptotic numerical method comprises a ray-launching method, a geometrical optics method, a ray-launching geometrical optics method, a physical optics method, a geometrical theory of diffraction method, or a physical theory of diffraction method.

7. The method of claim 1, wherein the simulating of the electromagnetic radiation fields radiated into space by the active elements comprises performing a full-wave simulation method that solves for a complete set of Maxwell's equations.

8. The method of claim 1, further comprising:
simulating, using the asymptotic numerical method, the far-field radiation patterns as rays or ray fields radiated into space; and determining interactions of the rays or ray fields with the at least one interaction structure.

9. A non-transitory computer-readable storage media comprising computer-executable instructions for generating a point-source model for an antenna array that, when executed, cause a processor of a computing device to:

generate a source model, the source model modeling at least two active elements of the antenna array and an antenna structure of the antenna array, the antenna structure comprising at least two passive elements and at least one of a surface of the antenna array, a circuit board of the antenna array, a ground plane of the antenna array, a radome of the antenna array, or an enclosure of the antenna array;

simulate electromagnetic radiation fields radiated into space by the active elements, the simulating based on the antenna structure modeled at a position within the electromagnetic radiation fields;

extract, based on interactions of the electromagnetic radiation fields with the antenna structure, at least seven near-field values for each of the active elements and for each of the passive elements;

generate far-field radiation patterns for each of the active elements and the passive elements, respectively, the generating based on a near-field-to-far-field transformation on the near-field value for that active or passive element; and output the far-field radiation patterns of the active elements and the passive elements, the far-field radiation patterns effective to simulate, using an asymptotic numerical method, electromagnetic interactions between the antenna array and at least one interaction structure, the asymptotic numerical method simulating the far-field radiation patterns as rays or ray fields.

10. The non-transitory computer-readable storage media of claim 9, wherein the antenna structure of the source model further comprises the surface of the antenna array, the circuit board of the antenna array, and the radome of the antenna array.

11. The non-transitory computer-readable storage media of claim 9, wherein the active elements comprise patch elements of one or more patch antenna subarray, slot elements of one or more slot antenna subarray, or dipole elements of one or more dipole antenna subarray.

12. The non-transitory computer-readable storage media of claim 11, wherein the antenna array comprises a radar antenna, a fifth-generation (5G) wireless technology antenna, a 60-Gigahertz wireless network antenna, a Ka-band antenna, or a short-range communication antenna.

13. The non-transitory computer-readable storage media of claim 9, wherein the asymptotic numerical method comprises a ray-launching method, a geometrical optics method, a ray-launching geometrical optics method, a physical optics method, a geometrical theory of diffraction method, or a physical theory of diffraction method.

14. The non-transitory computer-readable storage media of claim 9, wherein the computer-executable instructions, when executed, further causes the processor of the computing device to perform a full-wave simulation method that solves a complete set of Maxwell's equations.

15. The non-transitory computer-readable storage media of claim 9, wherein the computer-executable instructions, when executed, further cause the processor of the computing device or another processor of another computing device to:
  simulate, using the asymptotic numerical method, the far-field radiation patterns as rays or ray fields radiated into space; and
  determine interactions of the rays or ray fields with the at least one interaction structure.

16. The non-transitory computer-readable storage media of claim 9, wherein:
  the active elements comprise a first subset of the elements in a transmitter of the antenna array and the passive elements comprise a second subset of elements in the transmitter; and
  the computer-executable instructions, when executed, further cause the processor of the computing device to generate another point-source model for the antenna array with the second subset of elements modeled as the active elements in another source model and the first subset of elements modeled as the passive elements in the other source model.

17. A system for generating a point-source model for an antenna array comprising:
  means for generating a source model, the source model modeling at least two active elements of the antenna array and an antenna structure of the antenna array, the antenna structure comprising at least two passive elements and at least one of a surface of the antenna array, a circuit board of the antenna array, a ground plane of the antenna array, a radome of the antenna array, or an enclosure of the antenna array;
  means for simulating electromagnetic radiation fields radiated into space by the active elements, the simulating based on the antenna structure modeled at a position within the electromagnetic radiation fields;
  means for extracting, based on interactions of the electromagnetic radiation fields with the antenna structure, at least seven near-field values for each of the active elements and for each of the passive elements;
  means for generating far-field radiation patterns for each of the active elements and the passive elements, respectively, the generating based on a near-field-to-far-field transformation on the near-field value for the respective active elements and the respective elements; and
  means for outputting the far-field radiation patterns of the active elements and the passive elements, the far-field radiation patterns effective to simulate, using an asymptotic numerical method, electromagnetic interactions between the antenna array and at least one interaction structure, the asymptotic numerical method simulating the far-field radiation patterns as rays or ray fields.

18. The system of claim 17, wherein the antenna structure of the source model further comprises the surface of the antenna array, the circuit board of the antenna array, and the radome of the antenna array.

19. The system of claim 17, wherein:
  the active elements comprise a first subset of the elements in a transmitter of the antenna array and the passive elements comprise a second subset of elements in the transmitter; and
  the system further comprises means for generating another point-source model for the antenna array with the second subset of elements modeled as the active elements in another source model and the first subset of elements modeled as the passive elements in the other source model.

20. The system of claim 17, wherein the active elements comprise patch elements of one or more patch antenna subarray, slot elements of one or more slot antenna subarray, or dipole elements of one or more dipole antenna subarray.

* * * * *